(12) United States Patent
Ezura (10) Patent No.: US 7,971,079 B2
(45) Date of Patent: Jun. 28, 2011

(54) APPARATUS HAVING POWER SAVING MODE AND METHOD OF CONTROLLING APPARATUS

(75) Inventor: Kazuya Ezura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 714 days.

(21) Appl. No.: 11/783,858

(22) Filed: Apr. 12, 2007

(65) Prior Publication Data

US 2007/0250733 A1  Oct. 25, 2007

(30) Foreign Application Priority Data

Apr. 21, 2006 (JP) ................... 2006-117890

(51) Int. Cl.
*G06F 1/32* (2006.01)
(52) U.S. Cl. ......... 713/320; 713/300; 713/323; 713/324
(58) Field of Classification Search .................. 713/300, 713/320, 322, 323, 324, 340
See application file for complete search history.

(56) References Cited

U.S. PATENT DOCUMENTS

| | | | | |
|---|---|---|---|---|
| 6,883,980 | B2 * | 4/2005 | Guddanti | 400/61 |
| 2003/0105983 | A1 * | 6/2003 | Brakmo et al. | 713/320 |
| 2004/0158674 | A1 * | 8/2004 | Cloutier et al. | 711/115 |
| 2005/0231639 | A1 * | 10/2005 | Kubota et al. | 348/552 |
| 2005/0286912 | A1 | 12/2005 | Matsuzaki | |
| 2006/0212727 | A1 * | 9/2006 | Judge et al. | 713/300 |

FOREIGN PATENT DOCUMENTS

| | | |
|---|---|---|
| JP | 61-279577 | 12/1986 |
| JP | 8-37586 | 2/1996 |
| JP | 9-83693 | 3/1997 |
| JP | 11-32134 | 2/1999 |
| JP | 2001-177673 | 6/2001 |
| JP | 2001-257818 | 9/2001 |
| JP | 2003-8794 | 1/2003 |
| JP | 2003-92650 | 3/2003 |
| JP | 2003-274058 | 9/2003 |

* cited by examiner

*Primary Examiner* — Thomas Lee
*Assistant Examiner* — Paul B Yanchus, III
(74) *Attorney, Agent, or Firm* — Dickstein Shapiro LLP (57) ABSTRACT

An apparatus operable to enter a power saving mode in which a main portion of the apparatus is powered off includes an alarm unit configured to produce an alarm upon detection that the data waiting for processing is present, a power saving mode transition check unit configured to check whether transition conditions for transition to the power saving mode are satisfied, a first control unit configured to cause the apparatus to enter the power saving mode without having the alarm unit powered on upon the transition conditions being satisfied and upon detection that the data waiting for processing is absent, and a second control unit configured to check a predetermined condition upon the transition conditions being satisfied and upon detection that the data waiting for processing is present, and configured to cause the apparatus to enter the power saving mode upon finding that the predetermined condition is satisfied.

13 Claims, 7 Drawing Sheets

APPARATUS HAVING POWER SAVING MODE AND METHOD OF CONTROLLING APPARATUS

BACKGROUND OF THE INVENTION

1. Field of the Invention

The present invention generally relates to copier machines, facsimile apparatuses, multifunctional machines, communication apparatuses, communication methods, and computer-readable memory media, and particularly relates to a copier machine, a facsimile apparatus, a multifunctional machine, a communication apparatus, a communication method, and a computer-readable memory medium for use with a data transmission/reception unit for transmitting and receiving data through a communication channel.

2. Description of the Related Art

Some image forming apparatuses are conventionally provided with the function to perform facsimile transmission at a prescribed time to transmit an image that has been scanned in advance. Such image forming apparatuses may enter a power saving mode until the prescribed time if there is no operation input, followed by resuming its operation by exiting from the power saving mode upon the arrival of the prescribed time to perform the facsimile transmission (see Patent Document 1).

In recent years, further, some image forming apparatuses have been designed such that a power-indicator LED for indicating the power-on of an apparatus is removed for the purpose of reducing cost, so that nothing is displayed during the power saving mode similarly to the manner in which nothing is displayed during main power-off.

[Patent Document 1] Japanese Patent Application Publication No. 2003-92650

In the image forming apparatuses without the power-indicator LED, however, a menu and the like on the operation and display panel are completely turned off upon entry into the power saving mode, without providing a means such as the power-indicator LED to allow checking of the power-on/off state of the apparatus. Under such conditions, the user may mistakenly think that the power is not turned on, and may operate the main power switch to end up turning off the power. This gives rise to a problem in that if there is data waiting for processing such as document data waiting for transmission, such data is lost due to the accidental turning off of the power.

Accordingly, there is a need for a scheme by which a user will not turn off the power by mistakenly thinking that the power is not turned on if there is data waiting for processing. Further, there is a need for a scheme by which data is prevented from being lost when there is data waiting for processing even if a user turns off the power by mistakenly thinking that the power is not turned on

SUMMARY OF THE INVENTION

It is a general object of the present invention to provide an apparatus and method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an apparatus and method particularly pointed out in the specification in such full, clear, concise, and exact terms as to enable a person having ordinary skill in the art to practice the invention.

To achieve these and other advantages in accordance with the purpose of the invention, the invention provides an apparatus operable to enter a power saving mode in which a main portion of the apparatus is powered off, the apparatus including a data presence/absence check unit configured to detect whether data waiting for processing is present or absent in the apparatus, an alarm unit configured to produce an alarm upon detection by the data presence/absence check unit that the data waiting for processing is present, a power saving mode transition check unit configured to check whether transition conditions for transition to the power saving mode are satisfied, a first control unit configured to cause the apparatus to enter the power saving mode without having the alarm unit powered on upon the transition conditions being satisfied and upon detection by the data presence/absence check unit that the data waiting for processing is absent, and a second control unit configured to check a predetermined condition upon the transition conditions being satisfied and upon detection by the data presence/absence check unit that the data waiting for processing is present, and configured to cause the apparatus to enter the power saving mode upon finding that the predetermined condition is satisfied.

According to one aspect of the invention, the apparatus as described above is such that the predetermined condition requires that more than a predetermined time period remains before the processing is performed on the data, and the second control unit is configured to cause the apparatus to enter the power saving mode with the alarm unit powered on upon finding that the predetermined condition is satisfied.

According to another aspect of the invention, the apparatus as described above further includes a nonvolatile memory, wherein the predetermined condition requires that available space in the nonvolatile memory is sufficient to store the data waiting for processing, and the second control unit is configured to copy the data waiting for processing to the nonvolatile memory and then cause the apparatus to enter the power saving mode without having the alarm unit powered on upon finding that the predetermined condition is satisfied.

According to at least one embodiment of the present invention, provision is made to prevent a user from turning off the power by mistakenly thinking that the power is not turned on if there is data waiting for processing. Further, provision is made to prevent data from being lost when there is data waiting for processing even if a user turns off the power by mistakenly thinking that the power is not turned on.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, the best mode for carrying out the present invention will be described in detail by referring to the accompanying drawings.

Figure 1:
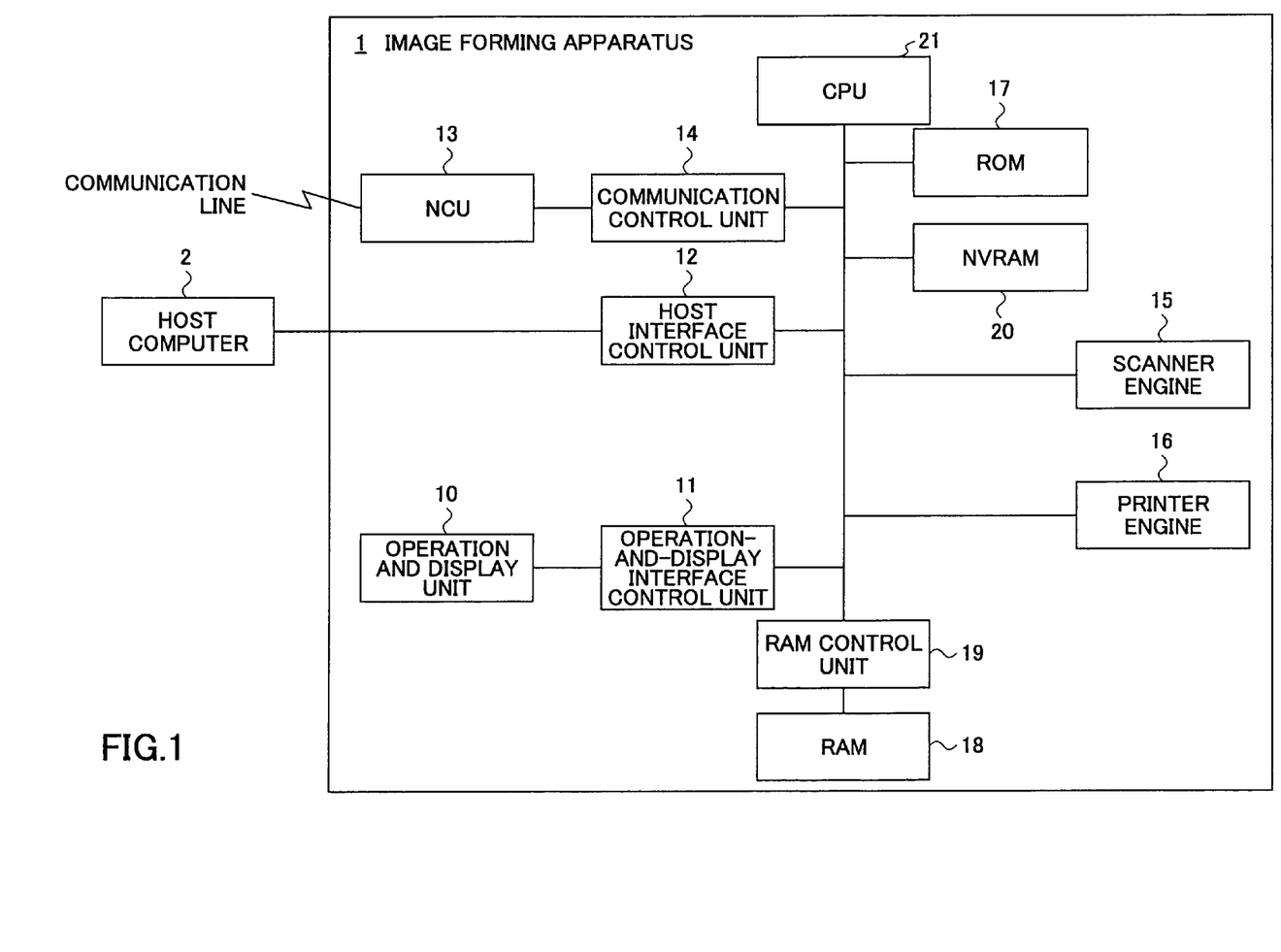
FIG. 1 is a block diagram showing a functional configuration of an image forming apparatus according to first through third embodiment of the present invention.

FIG. 1 is a block diagram showing a functional configuration of an image forming apparatus according to first through third embodiment of the present invention.

An image forming apparatus 1 may be a copier machine, facsimile apparatus, or multifunctional machine including a communication unit, and is connected to a host computer 2 such as a personal computer. The image forming apparatus 1 includes an operation and display unit 10, an operation-and-display interface control unit 11, a host interface control unit 12, a network control unit (NCU) 13, a communication control unit 14, a scanner engine 15, a printer engine 16, a ROM 17, a RAM 18, a RAM control unit 19, an NVRAM 20, and a CPU 21.

The operation and display unit 10 is a man-machine interface that includes various types of buttons and switches for operating the image forming apparatus 1, various indicators such as a speaker and a display unit inclusive of LEDs and an LCD for displaying the state of the apparatus. The operation and display unit 10 displays various types of information such as messages and menus at the time the user operates the apparatus. The operation and display unit 10 thus serves as an alarm means in the present invention.

The operation-and-display interface control unit 11 performs the input/output control of the operation and display unit 10. The host interface control unit 12 is connected to the host computer 2 in such a manner as to exchange data through a local connection such as IEEE1284 or USB or through a wireless or wired network connection such as an Ethernet, thereby performing control for exchanging various data with the host computer 2.

The NCU 13 performs call transmission/reception and dialing control with respect to a communication channel including a general public line.

The communication control unit 14 controls facsimile transmission and reception as well as an Internet connection via the NCU 13, and further performs the coding of data at the time of facsimile transmission and the decoding of data at the time of facsimile reception.

The scanner engine 15 is an image scan unit for scanning a document image to acquire image data.

The printer engine 16 serves to print data on a record medium such as a paper sheet by use of an imaging method such as a laser method, LED method, or inkjet method when the data is provided as image data scanned by the scanner engine 15, print data inclusive of image data received from the host computer 2, image data received through facsimile, or data received through the Internet.

The ROM 17 is a nonvolatile read-only memory, and stores a program for the present invention as well as programs for execution by the CPU 21 for the purpose of overall control of the image forming apparatus.

The RAM 18 is a volatile readable/writable memory, and serves as a temporal storage under the control of the RAM control unit 19 to store data processed by the CPU 21 and other processing blocks. Further, the RAM 18 stores various data waiting for processing such as document data waiting for transmission and received document data waiting for outputting.

The RAM control unit 19 controls the reading and writing of data with respect to the RAM 18.

The NVRAM 20 is a nonvolatile readable/writable memory, and serves to store information unique to the image forming apparatus (e.g., various parameters inclusive of a count indicating the number of copies). The NVRAM 20 also is used for the purpose of storing data waiting for processing as the data is evacuated according to the present invention. The NVRAM 20 corresponds to a nonvolatile memory unit of the communication apparatus of the present invention.

The CPU 21 executes the programs for overall control of the image forming apparatus stored in the ROM 17 so as to provide the various functions of the image forming apparatus such as a copy function, a scan function, a print function, a facsimile function, and a data communication function for communicating with the host computer 2. Further, the CPU 21 executes the program of the present invention stored in the ROM 17 to perform a communication method according to the present invention as well as to provide various functions of the communication apparatus of the present invention.

The NCU 13, the communication control unit 14, and the CPU 21 together serve as a data transmission and reception unit.

The program of the present invention described above may be stored in a computer-readable memory medium such as an optical disk including a CD and DVD or a magneto-optical disk. A disk drive (not shown) may be coupled to the image forming apparatus 1, and the memory medium described above may be mounted in this disk drive so as to install the program to the NVRAM 20 in executable form. A disk drive (not shown) may be coupled to the host computer 2, and the memory medium described above may be mounted in this disk drive so as to install the program from the host computer 2 to the NVRAM 20 in executable form. The program of the present invention may alternatively be downloaded to the NVRAM 20 in executable form through a communication channel and the Internet from a remote memory medium.

Figure 2:
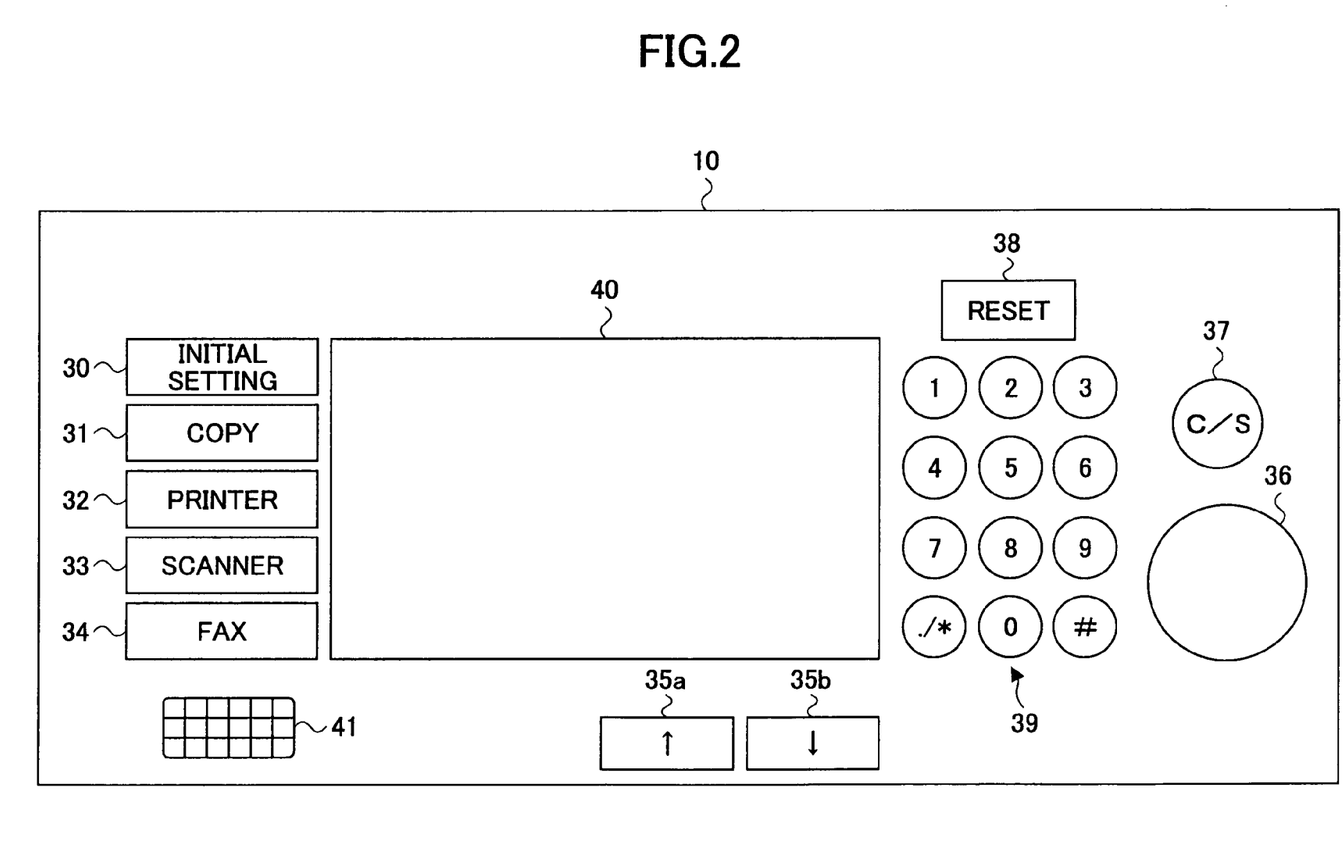
FIG. 2 is a front view of the operation and display unit shown in FIG. 1.

FIG. 2 is a front view of the operation and display unit 10 shown in FIG. 1.

An initial setting key 30 provided on the operation and display unit 10 is used to make initial settings for the fax function, copy function, printer function, scanner function, and the like.

A copy key 31 is one of the application switch keys, and is used to switch over to the copy function.

A printer key 32 is also one of the application switch keys, and is used to switch over to the printer function.

A scanner key 33 is also one of the application switch keys, and is used to switch over to the scanner function.

A fax key 34 is also one of the application switch keys, and is used to switch over to the fax function. The fax key 34 may be provided with an LED for indicating the presence of a received document waiting for outputting or a document waiting for transmission at the time of transition to the power saving mode. In such case, the lighting of the LED can be used for the alarm purpose in the present invention.

Selection keys 35a and 35b are used to select various types of functions displayed on a display unit 40.

A start key 36 is used to order the start of copying or reading of a document.

A clear stop key 37 is used to clear various settings or suspending a process such as a facsimile transmission process.

A reset key 38 is used for various types of reset instructions including the resetting of a facsimile transmission.

A key pad 39 provides a set of keys that are used to enter symbols and numeric values such as a facsimile number.

The display unit 40 is an LCD or the like that displays various menus, message character strings, bitmap images, etc., and is also used for the purpose of displaying an alarm message according to the present invention.

A speaker 41 produces voice sounds to convey messages at the time of operation, and also produces voice sounds for the alarm purpose in the present invention.

In the configuration described above, the keys are shown as hard keys. Alternatively, these keys may be provided as soft keys displayed on the liquid crystal touch panel.

First Embodiment

The image forming apparatus 1 of the first embodiment enters a first power saving mode upon power-on if the conditions for entering the power saving mode are satisfied and if there is no data waiting for processing that is scheduled to undergo predetermined processing at a preset processing time. Where there is data waiting for processing upon the power saving mode transition conditions being met, the image forming apparatus 1 alarms (informs) users of the presence of the data waiting for processing and enters a second power saving mode if more than a predetermined time period remains before the arrival of the preset processing time, and does not enter the power saving mode if more than the predetermined time period is not left.

The program for performing the procedures described above is stored in the ROM 17, and the CPU 21 executes the stored program to perform a communication method comprised of these procedures.

The CPU 21 serves as a power saving mode transition check unit, a data presence/absence checking unit, a first control unit, a time difference check unit, and a second control unit.

The CPU 21 and the operation and display unit 10 serve as an alarm unit.

The cases in which the preset transition conditions for entering the power saving mode are satisfied include a case in which the power key (different from the switch for turning the power on/off of the main power supply) was not pressed during a predetermined time period (i.e., a power saving mode transition period) following the power on of the apparatus, a case in which there has been no access from the host computer 2, a case in which a remote request for entering the power saving mode is issued from the host computer 2, the WEB browser through the Internet, or a dedicated utility software, a case in which there has been no operation on the operation and display unit 10 and no reception of a facsimile through a communication line, and a case in which the preset power saving mode transition period has passed without any operation performed on the image forming apparatus 1 such as on the operation and display unit 10.

Accordingly, the transition conditions are not satisfied if any one of access from the host computer 2, facsimile reception through the communication line, and operation performed on the operation and display unit 10 occurs during a preset time period following power on, or if any one of these activities occurs during the preset time period following the occurrence of any one of these activities.

The data waiting for processing includes document data waiting for memory transmission that transmits the document data at a preset transmission time to a preset transmission destination, and also includes received document data waiting for output processing that prints the received facsimile document data stored in the RAM 18 at a preset time.

The first power saving mode is a mode in which power supply is suspended with respect to the alarm unit and main portion of the image forming apparatus 1. In this first power saving mode, for example, the NCU 13 for fax reception, the communication control unit 14, the ROM 17, the RAM 18, the RAM control unit 19, the NVRAM 20, and the CPU 21 receive power supply while the operation and display unit 10, the scanner engine 15, and the printer engine 16 are powered off.

The second power saving mode is a mode in which power supply is maintained with respect to the alarm unit while power supply is suspended with respect to the main portion of the image forming apparatus 2. In this second power saving mode, for example, the NCU 13 for fax reception, the communication control unit 14, the ROM 17, the RAM 18, the RAM control unit 19, the NVRAM 20, and the CPU 21 receive power supply while the scanner engine 15 and the printer engine 16 are powered off, with the operation and display unit 10 kept powered on. Alternatively, power may be supplied only to the display unit 40 of the operation and display unit 10 or supplied only to light the LED of the fax key 34 on the operation and display unit 10.

Figure 3:
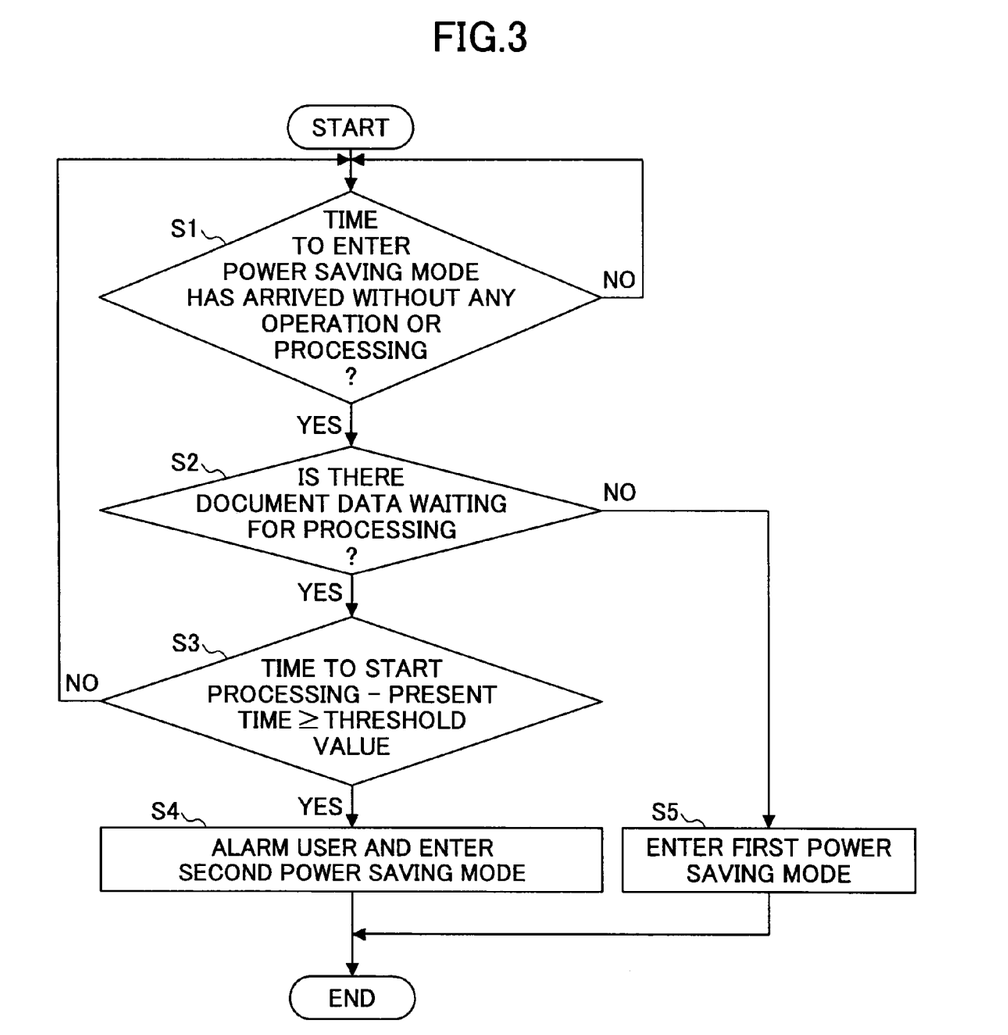
FIG. 3 is a flowchart showing a power saving control process performed by the image forming apparatus of the first embodiment.

FIG. 3 is a flowchart showing a power saving control process performed by the image forming apparatus 1 of the first embodiment.

In step S1, the CPU 21 checks whether the power saving mode transition period has passed without any operation performed on the operation and display unit or whether the power saving mode transition period has passed without access from the host computer and facsimile reception. If the period has not yet come to an end, the check is repeated. Upon the arrival of the end of the period, a check is made as to whether there is document data waiting for processing in step S2. If there is no such document data, transition to the first power saving mode is made in step S5, and, then, the procedure comes to an end.

If the check in step S2 finds that the document data waiting for processing is in existence, a check is made in step S3 as to whether a time difference between the present time at which the document data waiting for processing is found to exist and a process start time at which the processing of the document data waiting for processing will start is greater than a preset threshold value (i.e., threshold time length). If the time difference is not greater than the preset threshold value, the procedure returns to step S1. If the time difference is greater than the preset threshold value, transition to the second power saving mode is made while continuing to produce an alarm indicative of the presence of the data waiting for processing in step S4. With this, the procedure comes to an end.

In the procedure described above, step S1 corresponds to a power saving mode transition check step, step S2 to a data presence/absence check step, step S5 to a first control step, step S3 to a time difference check step, and step S4 to an alarm step and a second control step.

In the procedure described above, the process start time is the time of start of facsimile transmission if the document data waiting for processing is document data waiting for facsimile transmission. Alternatively, the process start time is the time of start of printing the facsimile received document data or outputting such data to the host computer if the document data waiting for processing is facsimile received document data waiting for outputting.

As a method of checking the presence of document data waiting for transmission, the following method may be used, for example:

allocate part of the memory (e.g., the RAM 18) as a memory area for storing document data waiting for transmission and check whether there is document data stored in this memory area; or store a request entry upon the issuing of a transmission request from a user and check whether there is a stored request entry to determine whether document data waiting for transmission exists.

In the power saving control process described above, the following procedure may be used as a method of identifying the document data having the earliest transmission time if two or more document data items waiting for transmission are in existence:

1. allocate an area (hereinafter referred to an area x) in memory (e.g., the RAM 18) to store a transmission time;
2. write to the area x the transmission time of first document data waiting for transmission;
3. compare the transmission time written to the area x with the transmission time of the next document data waiting for transmission and write to the area x the transmission time of the next document data waiting for transmission if the transmission time of the next document data waiting for transmission is earlier; and
4. repeat the process of item 3 until the comparison of transmission time is performed with respect to all the document data items waiting for transmission.

After the processes of items 1 through 4 described above are completed, the transmission time stored in the area x indicates the earliest transmission time.

The alarm unit previously described may be the LED of the fax key 34 being lit or flashing on the communication control unit 14, the display unit 40 showing a message on the operation and display unit 10, or the speaker 41 producing a voice message or alarm sound.

Upon the power saving mode transition conditions being met, power supply to the main portion inclusive of the operation and display unit 10, the scanner engine 15, and the printer engine 16 is suspended to enter the first power saving mode (corresponding to a normal power saving mode) if no document data waiting for facsimile transmission or no facsimile received document data waiting for outputting is stored in the RAM 18. This can improve the power saving performance.

Upon the power saving mode transition conditions being met, power supply to the main portion inclusive of the operation and display unit 10, the scanner engine 15, and the printer engine 16 is not suspended to enter the first power saving mode (corresponding to a normal power saving mode) if there is document data waiting for facsimile transmission or facsimile received document data waiting for outputting stored in the RAM 18. Instead, power supply to all or part of the operation and display unit 10 is maintained, so that any one of the display unit 40, the LED of the fax key 34, and the speaker 41 operable by use of the supplied power produces an alarm, thereby calling the user's attention to the fact that the image forming apparatus 1 has not been powered off, but has entered the power saving mode, and the fact that the power switch should not be turned off by mistake since there is stored data waiting for processing.

Accordingly, even if the LED that is supposed to be lit during power on is removed for the purpose of reducing the manufacturing cost of the image forming apparatus 1, resulting in difficulty distinguishing between the power saving mode and the power-off state, an alarm indicative of the presence of data waiting for processing continues to be made during the power saving mode, thereby cautioning users not to turn off the power switch while intending to turn on the switch by mistakenly thinking that the apparatus has been powered off.

Further, the image forming apparatus 1 of the first embodiment compares the transmission time or output time with the present time upon the power saving mode transition conditions being met if there is document data waiting for facsimile transmission or facsimile received document data waiting for outputting stored in the RAM 18, and enters the second power saving mode while producing an alarm if a substantial time period remains before the arrival of such transmission or output time. If there is not sufficient time remaining before the arrival of the time of processing of the data waiting for processing, transition to the power saving mode is not performed. This can prevent deterioration and malfunction from occurring due to the frequent turning on/off of the power of the main portion inclusive of the scanner engine 15 and the printer engine 16.

In the flowchart shown in FIG. 3, step S1 and step S2 may be swapped in order for some reason such as the convenience of program design. Even with such swapping, the same advantages as described above are obtained.

Figure 4:
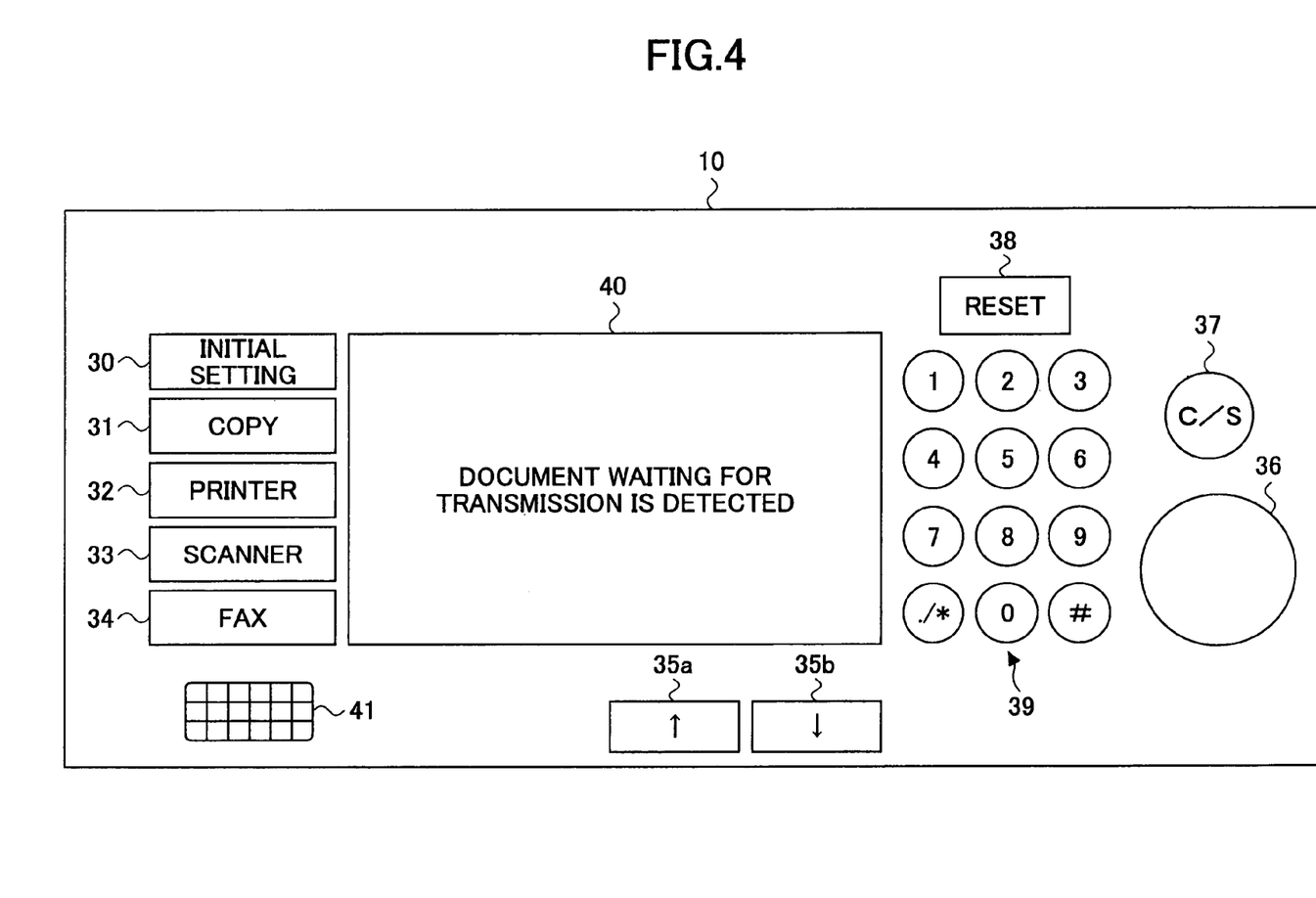
FIG. 4 is a drawing showing an example of alarming users by use of the operation and display unit shown in FIG. 1.
Figure 5:
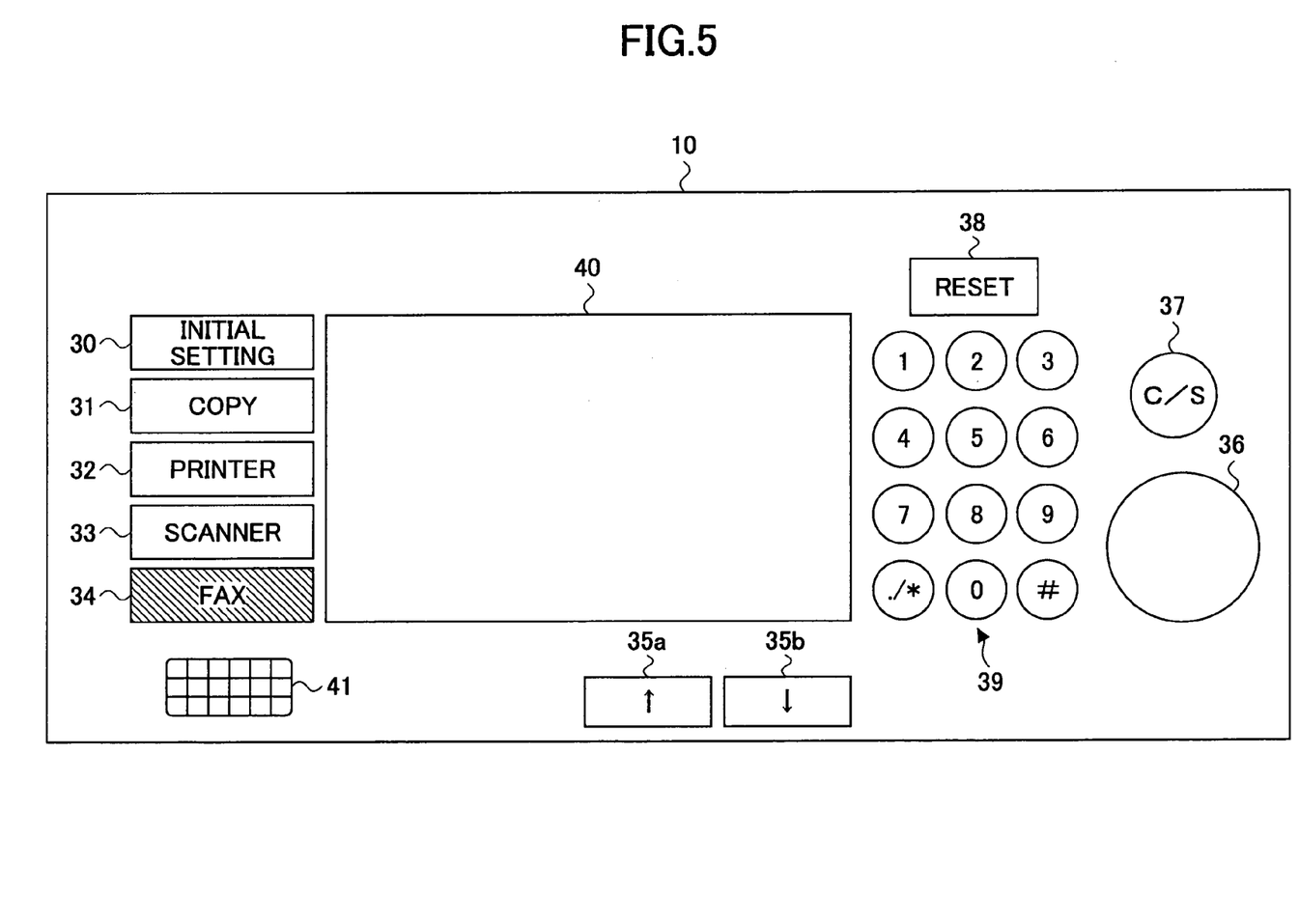
FIG. 5 is a drawing showing another example of alarming users by use of the operation and display unit shown in FIG. 1.

FIG. 4 is a drawing showing an example of alarming users by use of the operation and display unit 10. FIG. 5 is a drawing showing another example of alarming users by use of the operation and display unit 10.

As shown in FIG. 4, the message "document waiting for transmission is detected" is displayed for users on the display unit 40 if the power saving mode transition conditions are satisfied and if there is document data waiting for transmission, for example. This can caution the users not to operate the power switch by mistake since the apparatus is already powered on and now placed in the power saving mode with the document waiting for transmission.

The flashing of the message displayed on the display unit 40 may make the message more conspicuous and easily noticeable to users.

As shown in FIG. 5, the LED of the fax key 34 may be lit to alarm users. This can caution the users not to operate the power switch by mistake since the apparatus is already powered on and now placed in the power saving mode with the document waiting for transmission. The flashing of the LED of the fax key 34 may make the alarm more conspicuous and easily noticeable to users.

Alternatively, a dedicated lamp may be provided for the purpose of alarming users of the presence of data waiting for processing, and may be lit or made to flash (blink).

Further, the speaker 41 of the operation and display unit 10 may be made to produce a voice message indicating the presence of document waiting for transmission, or may be made to produce an alarm sound or melody.

The description has been provided above with reference to an example in which data waiting for processing includes document data waiting for transmission and received document data waiting for outputting. Other data waiting for processing that should be processed at a predetermined time in the image forming apparatus 1 can also be treated in the same manner as in the above example.

Second Embodiment

The image forming apparatus 1 of the second embodiment enters a first power saving mode upon power-on if the conditions for entering the power saving mode are satisfied and if there is no data waiting for processing that is scheduled to undergo predetermined processing at a preset processing time. Where there is data waiting for processing upon the power saving mode transition conditions being met, the image forming apparatus 1 enters the first power saving mode while copying the data waiting for processing to the NVRAM 20 if the amount of the data waiting for processing is smaller than the space available in the NVRAM 20 that is a nonvolatile memory means, and alarms (informs) users of the presence of the data waiting for processing and enters a second power saving mode if the amount of the data waiting for processing is not smaller than the space available in the NVRAM 20.

The program for performing the procedures described above is stored in the ROM 17 to suspend power supply to the main portion of the apparatus while maintaining the power supply used for the alarm purpose upon determination that the amount of data waiting for processing is not smaller than the space available in the nonvolatile memory means, and the CPU 21 executes the stored program to perform a communication method comprised of these procedures to suspend power supply to the main portion of the apparatus while maintaining the power supply used for the alarm purpose upon determination that the amount of data waiting for processing is not smaller than the space available in the nonvolatile memory means.

Namely, the CPU 21 serves as the power saving mode transition check unit, the data presence/absence check unit, the first control unit, and an available space check unit, and also serves as the second control unit to suspend power supply to the main portion of the apparatus while maintaining the power supply used for the alarm unit upon determination by the available space check unit that the amount of data waiting for processing is not smaller than the space available in the nonvolatile memory means.

The CPU 21 and the operation and display unit 10 serve as an alarm unit.

Figure 6:
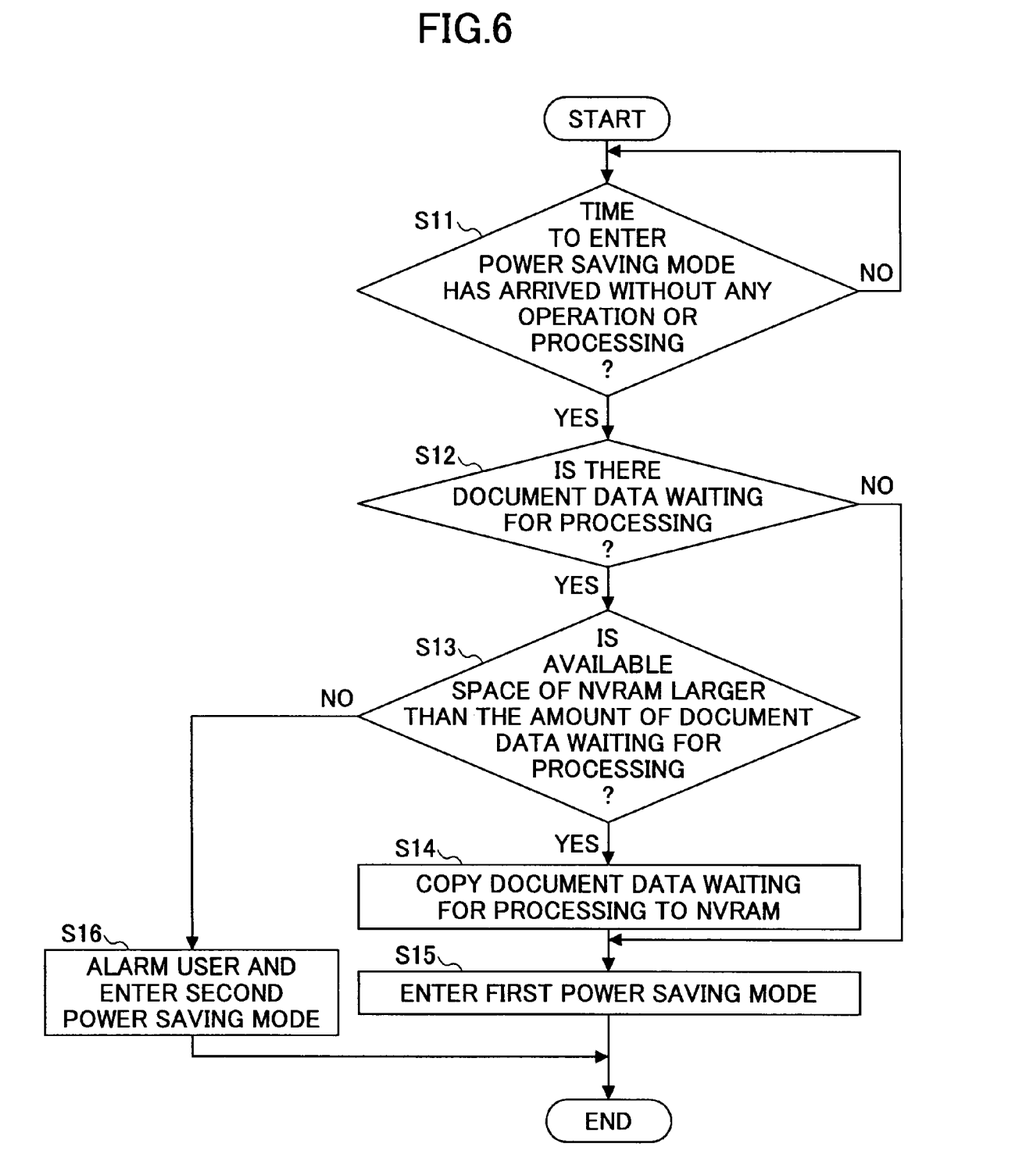
FIG. 6 is a flowchart showing a power saving control process performed by the image forming apparatus of the second embodiment.

FIG. 6 is a flowchart showing a power saving control process performed by the image forming apparatus 1 of the second embodiment.

In step S11, the CPU 21 checks whether the power saving mode transition period has passed without any operation performed on the operation and display unit or whether the power saving mode transition period has passed without access from the host computer and facsimile reception. If the period has not yet come to an end, the check is repeated. Upon the arrival of the end of the period, a check is made as to whether there is document data waiting for processing in step S12. If there is no such document data, transition to the first power saving mode is made in step S15, and, then, the procedure comes to an end.

Upon finding in step S12 that there is document data waiting for processing, a check is made in step S13 as to whether the available space of the NVRAM is larger than the amount of the document data waiting for processing. If the available space is larger, the document data waiting for processing is copied in step S14 to the NVRAM for evacuation. In step S15, then, transition to the first power saving mode is made. With this, the procedure comes to an end.

If the check in step S13 finds that the available space of the NVRAM is not larger than the amount of the document data waiting for processing, transition to the second power saving mode is made in step S16 while continuing to produce an alarm indicating the presence of data waiting for processing. With this, the procedure comes to an end.

The data stored in the NVRAM according to the above procedure is returned to the RAM upon exiting from the power saving mode (and removed from the NVRAM), and the prescribed process will be performed at the predetermined time.

In the procedure described above, step S11 corresponds to a power saving mode transition check step, step S12 to a data presence/absence check step, steps S11, S12, S15 to a first control step, step S13 to an available space check step, and steps S13 through S16 to a second control step.

In the procedure described above, if there are two or more document data items such as document data items waiting for facsimile transmission and/or facsimile received document data waiting for outputting, the amount of data as described above refers to the total data amount of all the document data items.

The available space as described above refers to the space that remains after subtracting the used space of the NVRAM 20 from the total space of the NVRAM 20.

The alarm unit may be the same as the one described in connection with the image forming apparatus 1 of the first embodiment. In addition, however, a message indicative of no copying due to insufficient space in the NVRAM 20 may be displayed on the display unit 40 if that is the case.

Upon the power saving mode transition conditions being met, power supply to the main portion inclusive of the operation and display unit 10, the scanner engine 15, and the printer engine 16 is suspended to enter the first power saving mode (corresponding to a normal power saving mode) if no document data waiting for facsimile transmission or no facsimile received document data waiting for outputting is stored in the RAM 18. This can improve the power saving performance.

Upon the power saving mode transition conditions being met, a check is made as to whether there is available space in the NVRAM 20 sufficient to store document data (all the document data corresponding to a plurality of items) if there is document data waiting for facsimile transmission or facsimile received document data waiting for outputting stored in the RAM 18. If there is sufficient available space, the data is copied to the NVRAM 20 for evacuation, and power supply to the main portion inclusive of the operation and display unit 10, the scanner engine 15, and the printer engine 16 is suspended to enter the first power saving mode (corresponding to a normal power saving mode). This eliminates the risk of losing the data waiting for processing, and can also improve the power saving performance.

Accordingly, even if the LED that is supposed to be lit during power on is removed for the purpose of reducing the manufacturing cost of the image forming apparatus 1, resulting in difficulty distinguishing between the power saving mode and the power-off state, the data waiting for processing will not be lost even if a user turns off the power switch while intending to turn on the switch by mistakenly thinking that the apparatus has been powered off.

Further, if there is not available space in the NVRAM 20 sufficient to store all the data waiting for processing, power supply to all or part of the operation and display unit 10 is maintained to drive the display unit 40, the LED of the fax key 34, or the speaker 41, thereby cautioning users not to turn off the power switch by mistake since the apparatus is already powered on and now placed in the power saving mode with stored data waiting for processing.

Such cautioning can prevent all or part of the data from being lost even when transition to the power saving mode is performed upon determination that the NVRAM 20 does not have sufficient available space so as not to be able to store all the data waiting for processing.

Further, even if the LED that is supposed to be lit during power on is removed for the purpose of reducing the manufacturing cost of the image forming apparatus 1, resulting in difficulty distinguishing between the power saving mode and the power-off state, an alarm indicative of the presence of data waiting for processing continues to be made for users, thereby cautioning users not to turn off the power switch while intending to turn on the switch by mistakenly thinking that the apparatus has been powered off.

In the flowchart shown in FIG. 6, step S11 and step S12 may be swapped in order for some reason such as the convenience of program design. Even with such swapping, the same advantages as described above are obtained.

Third Embodiment

The image forming apparatus 1 of the third embodiment enters a first power saving mode upon power-on if the conditions for entering the power saving mode are satisfied and if there is no data waiting for processing that is scheduled to undergo predetermined processing at a preset processing time. Where there is data waiting for processing upon the power saving mode transition conditions being met, the image forming apparatus 1 enters the first power saving mode while copying the data waiting for processing to the NVRAM 20 if the amount of the data waiting for processing is smaller than the space available in the NVRAM 20 that is a nonvolatile memory means, but alarms (informs) users of the presence of the data waiting for processing and refrains from entering a power saving mode if the amount of the data waiting for processing is not smaller than the space available in the NVRAM 20.

The program for performing the procedures described above is stored in the ROM 17 to refrain from entering a power saving mode upon determination that the amount of data waiting for processing is not smaller than the space available in the nonvolatile memory means, and the CPU 21 executes the stored program to perform a communication method comprised of these procedures to refrain from entering a power saving mode upon determination that the amount of data waiting for processing is not smaller than the space available in the nonvolatile memory means.

Namely, the CPU 21 serves as the power saving mode transition check unit, the data presence/absence check unit, the first control unit, and the available space check unit, and also serves as the second control unit to refrain from entering a power saving mode upon determination by the available space check unit that the amount of data waiting for processing is not smaller than the space available in the nonvolatile memory means.

The CPU 21 and the operation and display unit 10 serve as an alarm unit.

Figure 7:
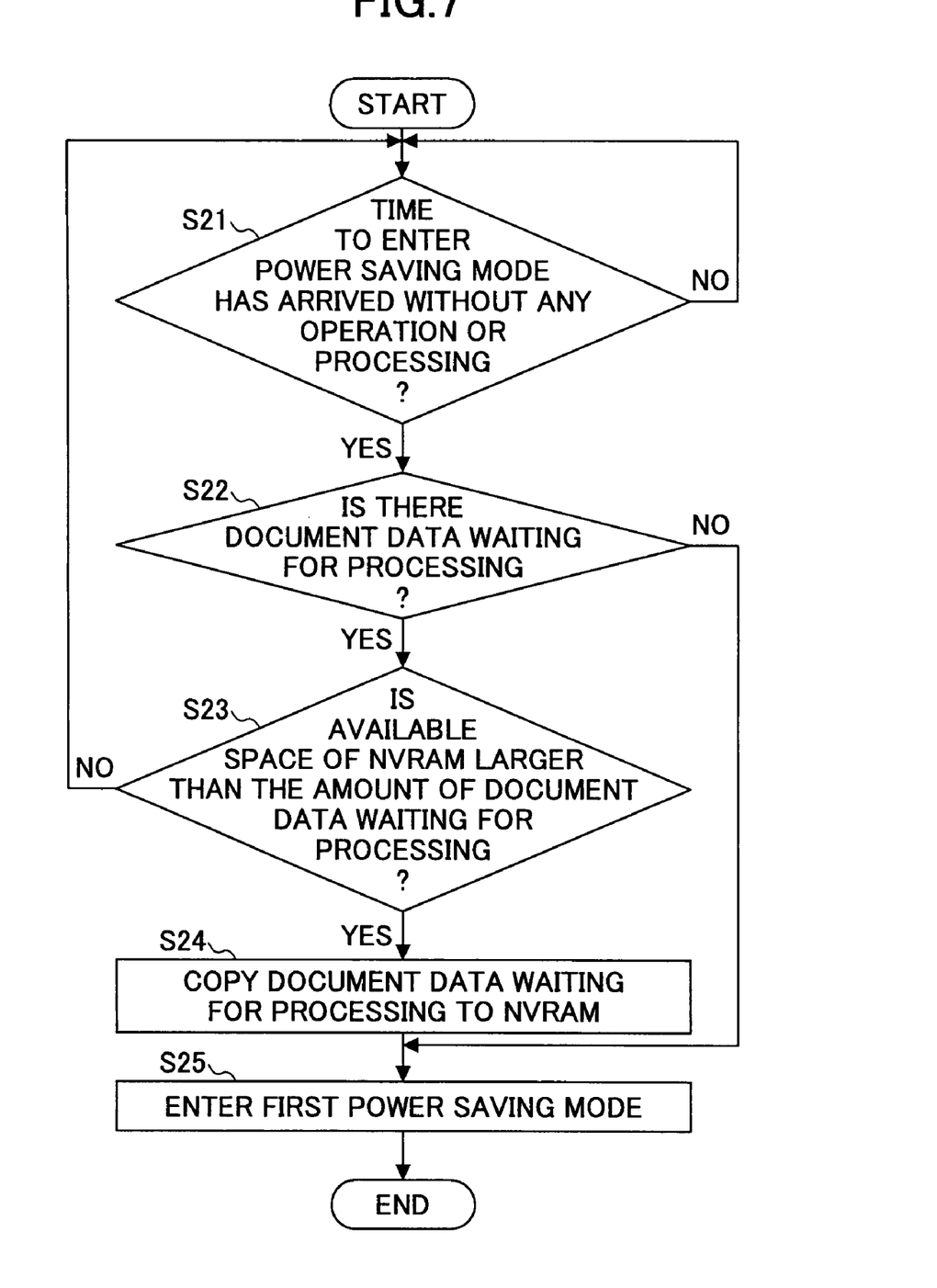
FIG. 7 is a flowchart showing a power saving control process performed by the image forming apparatus of the third embodiment.

FIG. 7 is a flowchart showing a power saving control process performed by the image forming apparatus 1 of the third embodiment.

In step S21, the CPU 21 checks whether the power saving mode transition period has passed without any operation performed on the operation and display unit or whether the power saving mode transition period has passed without access from the host computer and facsimile reception. If the period has not yet come to an end, the check is repeated. Upon the arrival of the end of the period, a check is made as to whether there is document data waiting for processing in step S22. If there is no such document data, transition to the first power saving mode is made in step S25, and, then, the procedure comes to an end.

Upon finding in step S22 that there is document data waiting for processing, a check is made in step S23 as to whether the available space of the NVRAM is larger than the amount of the document data waiting for processing. If the available space is larger, the document data waiting for processing is copied in step S24 to the NVRAM for evacuation. In step S25, then, transition to the first power saving mode is made. With this, the procedure comes to an end.

If the check in step S23 finds that the available space of the NVRAM is not larger than the amount of document data waiting for processing, no transition to a power saving mode is made, and the procedure goes back to step S21.

The data stored in the NVRAM according to the above procedure is returned to the RAM upon exiting from the power saving mode (and removed from the NVRAM), and the prescribed process will be performed at the predetermined time.

In the procedure described above, step S21 corresponds to a power saving mode transition check step, step S22 to a data presence/absence check step, steps S21, S22, S25 to a first control step, step S23 to an available space check step, and steps S23 through S26 to a second control step.

In the procedure described above, if there are two or more document data items such as document data items waiting for facsimile transmission and/or facsimile received document data waiting for outputting, the amount of data as described above refers to the total data amount of all the document data items.

The alarm unit may be the same as the one described in connection with the image forming apparatus 1 of the first embodiment. In addition, however, a message indicative of no copying due to insufficient space in the NVRAM 20 may be displayed on the display unit 40 if that is the case.

Upon the power saving mode transition conditions being met, power supply to the main portion inclusive of the operation and display unit 10, the scanner engine 15, and the printer engine 16 is suspended to enter the first power saving mode (corresponding to a normal power saving mode) if no document data waiting for facsimile transmission or no facsimile received document data waiting for outputting is stored in the RAM 18. This can improve the power saving performance.

Upon the power saving mode transition conditions being met, a check is made as to whether there is available space in the NVRAM 20 sufficient to store document data (all the document data corresponding to a plurality of items) if there is document data waiting for facsimile transmission or facsimile received document data waiting for outputting stored in the RAM 18. If there is sufficient available space, the data is copied to the NVRAM 20 for evacuation, and power supply to the main portion inclusive of the operation and display unit 10, the scanner engine 15, and the printer engine 16 is suspended to enter the first power saving mode (corresponding to a normal power saving mode). This eliminates the risk of losing the data waiting for processing, and can also improve the power saving performance.

Accordingly, even if the LED that is supposed to be lit during power on is removed for the purpose of reducing the manufacturing cost of the image forming apparatus 1, resulting in difficulty distinguishing between the power saving mode and the power-off state, the data waiting for processing will not be lost even if a user turns off the power switch while intending to turn on the switch by mistakenly thinking that the apparatus has been powered off.

Further, no transition to a power saving mode is made if there is not sufficient space available in the NVRAM 20 to store all the data waiting for processing, so that the display unit 40 of the display unit 40 provides some display indication. Accordingly, even if the LED that is supposed to be lit during power on is removed for the purpose of reducing the manufacturing cost of the image forming apparatus 1, resulting in difficulty distinguishing between the power saving mode and the power-off state, users will not mistakenly think that the image forming apparatus 1 has been powered off.

The first through third embodiments have been described mainly with reference to data that is transmitted or received through fax. By the same token, these embodiments are applicable to mail data that is transmitted or received through an Internet connection established on a communication line.

The communication apparatus and method according to the present invention are applicable to a personal computer such as a desktop computer or a notebook computer.

Further, the present invention is not limited to these embodiments, but various variations and modifications may be made without departing from the scope of the present invention.

The present application is based on Japanese priority application No. 2006-117890 filed on Apr. 21, 2006, with the Japanese Patent Office, the entire contents of which are hereby incorporated by reference.

What is claimed is:

1. An apparatus operable to enter a first or second power saving mode in which a main portion of the apparatus is powered off, comprising:
    a data presence/absence check unit configured to detect whether data waiting for processing is present or absent in the apparatus;
    an alarm unit configured to produce an alarm upon detection by the data presence/absence check unit that the data waiting for processing is present;
    a power saving mode transition check unit configured to check whether transition conditions for transition to the first or second power saving mode are satisfied;
    a first control unit configured to cause the apparatus to enter the first power saving mode without using the alarm unit and upon detection by the data presence/absence check unit that the data waiting for processing is absent;
    a second control unit configured to check a first predetermined condition upon the transition conditions being satisfied and upon detection by the data presence/absence check unit that the data waiting for processing is present, and configured to cause the apparatus to enter the second power saving mode upon finding that the first predetermined condition is satisfied; and
    a nonvolatile memory, wherein a second predetermined condition requires that available space in the nonvolatile memory is sufficient to store the data waiting for processing, and the second control unit is configured to copy the data waiting for processing to the nonvolatile memory and then cause the apparatus to enter the second power saving mode without having the alarm unit powered on upon finding that the second predetermined condition is satisfied,
    wherein the first predetermined condition requires that more than a predetermined time period remains before the processing is performed on the data, and the second control unit is configured to cause the apparatus to enter the second power saving mode with the alarm unit powered on upon finding that the first predetermined condition is satisfied, and
    wherein the transition conditions are not satisfied if a predetermined activity occurs during a preset time period.

2. The apparatus as claimed in claim 1, wherein the second control unit is configured to cause the apparatus to enter the second power saving mode with the alarm unit powered on upon finding that the second predetermined condition is not satisfied.

3. The apparatus as claimed in claim 1, wherein the second control unit is configured to cause the apparatus to refrain from entering the second power saving mode upon finding that the second predetermined condition is not satisfied.

4. The apparatus as claimed in claim 1, further comprising a communication unit configured to transmit and receive data, wherein the data waiting for processing is either document data waiting for transmission or received document data waiting for outputting.

5. The apparatus as claimed in claim 1, wherein the alarm unit indicates the presence of the data waiting for processing through visual indication or audio indication.

6. A method of controlling an apparatus operable to enter a first or second power saving mode in which a main portion of the apparatus is powered off, comprising:
    a data presence/absence check step of detecting whether data waiting for processing is present or absent in the apparatus;
    an alarm step of producing an alarm by use of an alarm unit upon detection by the data presence/absence check step that the data waiting for processing is present;
    a power saving mode transition check step of checking whether transition conditions for transition to the first or second power saving mode are satisfied;
    a first control step of causing the apparatus to enter the first power saving mode without having the alarm unit powered on and upon detection by the data presence/absence check step that the data waiting for processing is absent; and
    a second control step of checking a first predetermined condition upon the transition conditions being satisfied and upon detection by the data presence/absence check step that the data waiting for processing is present, and causing the apparatus to enter the second power saving mode upon finding that the first predetermined condition is satisfied,
    wherein the first predetermined condition requires that more than a predetermined time period remains before the processing is performed on the data and a second predetermined condition requires that available space in a nonvolatile memory is sufficient to store the data waiting for processing,
    wherein the second control step copies the data waiting for processing to the nonvolatile memory and then causes the apparatus to enter the second power saving mode without having the alarm unit powered on upon finding that the second predetermined condition is satisfied, and the second control step causes the apparatus to enter the second power saving mode with the alarm unit powered on upon finding that the second predetermined condition is satisfied, and
    wherein the transition conditions are not satisfied if a predetermined activity occurs during a preset time period.

7. The method as claimed in claim 6, wherein the second control step causes the apparatus to enter the second power saving mode with the alarm unit powered on upon finding that the second predetermined condition is not satisfied.

8. The method as claimed in claim 6, wherein the second control step causes the apparatus to refrain from entering the second power saving mode upon finding that the second predetermined condition is not satisfied.

9. The method as claimed in claim 6, wherein the apparatus includes a communication unit configured to transmit and receive data, and the data waiting for processing is either document data waiting for transmission or received document data waiting for outputting.

10. The method as claimed in claim 6, wherein the alarm step produces the alarm indicating the presence of the data waiting for processing through visual indication or audio indication.

11. A non-transitory computer-readable medium having a program embodied therein for causing a computer to control an apparatus operable to enter a first or second power saving mode in which a main portion of the apparatus is powered off, said program comprising program codes to cause the computer to perform:

a data presence/absence check step of detecting whether data waiting for processing is present or absent in the apparatus;

an alarm step of producing an alarm by use of an alarm unit upon detection by the data presence/absence check step that the data waiting for processing is present;

a power saving mode transition check step of checking whether transition conditions for transition to the first or second power saving mode are satisfied;

a first control step of causing the apparatus to enter the first power saving mode without having the alarm unit powered on and upon detection by the data presence/absence check step that the data waiting for processing is absent; and a second control step of checking a first predetermined condition upon the transition conditions being satisfied and upon detection by the data presence/absence check step that the data waiting for processing is present, and causing the apparatus to enter the second power saving mode upon finding that the first predetermined condition is satisfied, wherein the first predetermined condition requires that more than a predetermined time period remains before the processing is performed on the data and a second predetermined condition requires that available space in a nonvolatile memory is sufficient to store the data waiting for processing, wherein the second control step copies the data waiting for processing to the nonvolatile memory and then causes the apparatus to enter the second power saving mode without having the alarm unit powered on upon finding that the second predetermined condition is satisfied, and the second control step causes the apparatus to enter the second power saving mode with the alarm unit powered on upon finding that the second predetermined condition is satisfied, and wherein the transition conditions are not satisfied if a predetermined activity occurs during a preset time period.

12. The computer-readable medium as claimed in claim 11, wherein the second control step causes the apparatus to enter the second power saving mode with the alarm unit powered on upon finding that the second predetermined condition is not satisfied.

13. The computer-readable medium as claimed in claim 11, wherein the second control step causes the apparatus to refrain from entering the second power saving mode upon finding that the second predetermined condition is not satisfied.

* * * * *